United States Patent
Bendel et al.

(10) Patent No.: US 9,677,304 B2
(45) Date of Patent: Jun. 13, 2017

(54) MOTOR VEHICLE LOCK TOGETHER WITH A MANUFACTURING METHOD

(75) Inventors: Thorsten Bendel, Oberhausen (DE); Thomas Kippes, Meerbusch (DE); Dorothea Muller, Essen (DE); Klaus Gotzen, Mulheim (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 654 days.

(21) Appl. No.: 13/983,336

(22) PCT Filed: Jan. 30, 2012

(86) PCT No.: PCT/DE2012/000069
§ 371 (c)(1),
(2), (4) Date: Aug. 26, 2014

(87) PCT Pub. No.: WO2012/103869
PCT Pub. Date: Aug. 9, 2012

(65) Prior Publication Data
US 2015/0076842 A1  Mar. 19, 2015

(51) Int. Cl.
*E05C 19/00* (2006.01)
*E05B 85/00* (2014.01)
(Continued)

(52) U.S. Cl.
CPC ............... *E05B 85/00* (2013.01); *E05B 77/34* (2013.01); *E05B 79/02* (2013.01); *E05B 79/08* (2013.01);
(Continued)

(58) Field of Classification Search
CPC .......... E05B 79/02; E05B 79/20; E05B 77/34; E05B 79/08; E05B 85/00; E05B 85/02;
(Continued)

(56) References Cited

U.S. PATENT DOCUMENTS 7,021,681 B2 * 4/2006 Hayakawa ............... E05B 83/36
292/216
7,637,542 B2 * 12/2009 Suzumura ............... E05B 77/34
292/201
(Continued)

FOREIGN PATENT DOCUMENTS

DE  199 55 693 A1  5/2001
DE  101 44 166 A1  4/2003
(Continued)

OTHER PUBLICATIONS

International Search Report for corresponding patent application No. PCT/DE2012/000069 dated Jul. 20, 2012.

*Primary Examiner* — Kristina Fulton
*Assistant Examiner* — Christine M Mills
(74) *Attorney, Agent, or Firm* — Renner, Otto, Boisselle & Sklar, LLP

(57) ABSTRACT

The present invention relates to a lock having a lock housing (3, 4) together with a lock cover (2), a lock case (9), a locking mechanism which is mounted on the base surface of the lock case (9), and an activation device for opening the locking mechanism. An activation lever of the activation device is at least partially covered by a pivotable flap (5) of a lock covering means (2, 3). The invention also relates to a method for manufacturing the flap together with a lock cover (2) by injection molding.

10 Claims, 1 Drawing Sheet

(51) Int. Cl.
  *E05B 79/02* (2014.01)
  *E05B 77/34* (2014.01)
  *E05B 79/08* (2014.01)
  *E05B 79/20* (2014.01)
  *E05B 85/02* (2014.01)
  *B29K 67/00* (2006.01)
  *B29L 31/30* (2006.01)

(52) U.S. Cl.
  CPC .............. *E05B 79/20* (2013.01); *E05B 85/02* (2013.01); *B29K 2067/006* (2013.01); *B29L 2031/3005* (2013.01); *Y10S 292/23* (2013.01); *Y10S 292/53* (2013.01); *Y10S 292/54* (2013.01); *Y10T 292/03* (2015.04); *Y10T 292/57* (2015.04)

(58) Field of Classification Search
  CPC .... Y10S 292/23; Y10S 292/53; Y10S 292/54; Y10T 292/03; Y10T 70/489; Y10T 70/8459
  USPC ............... 292/1, DIG. 23, DIG. 53, DIG. 54; 70/53, 448
  See application file for complete search history.

(56) References Cited

U.S. PATENT DOCUMENTS

| | | | | |
|---|---|---|---|---|
| 2008/0289373 | A1* | 11/2008 | Suzumura | E05B 85/02 70/91 |
| 2010/0072761 | A1* | 3/2010 | Tomaszewski | E05B 77/26 292/201 |
| 2012/0174692 | A1* | 7/2012 | Haida | B60N 2/0232 74/108 |

FOREIGN PATENT DOCUMENTS

| | | | | |
|---|---|---|---|---|
| DE | 10144166 A1 | * | 4/2003 | ............ E05B 77/34 |
| DE | 102005059833 A1 | * | 8/2006 | ............ F16C 1/105 |
| DE | 10 2007 049078 A1 | | 4/2009 | |
| DE | 102007049078 A1 | * | 4/2009 | ............ E05B 77/10 |
| FR | 2 925 561 A1 | | 6/2009 | |
| FR | 2925561 A1 | * | 6/2009 | ............ E05B 77/34 |
| JP | 2002129813 A | * | 5/2002 | |
| JP | 2004204491 A | * | 7/2004 | |
| JP | 2011052535 A | * | 3/2011 | |
| JP | 2011132694 A | * | 7/2011 | |
| JP | 2012107426 A | * | 6/2012 | |
| JP | 2012108702 A | * | 6/2012 | |
| JP | WO 2012090574 A1 | * | 7/2012 | ............ E05B 85/02 |

* cited by examiner

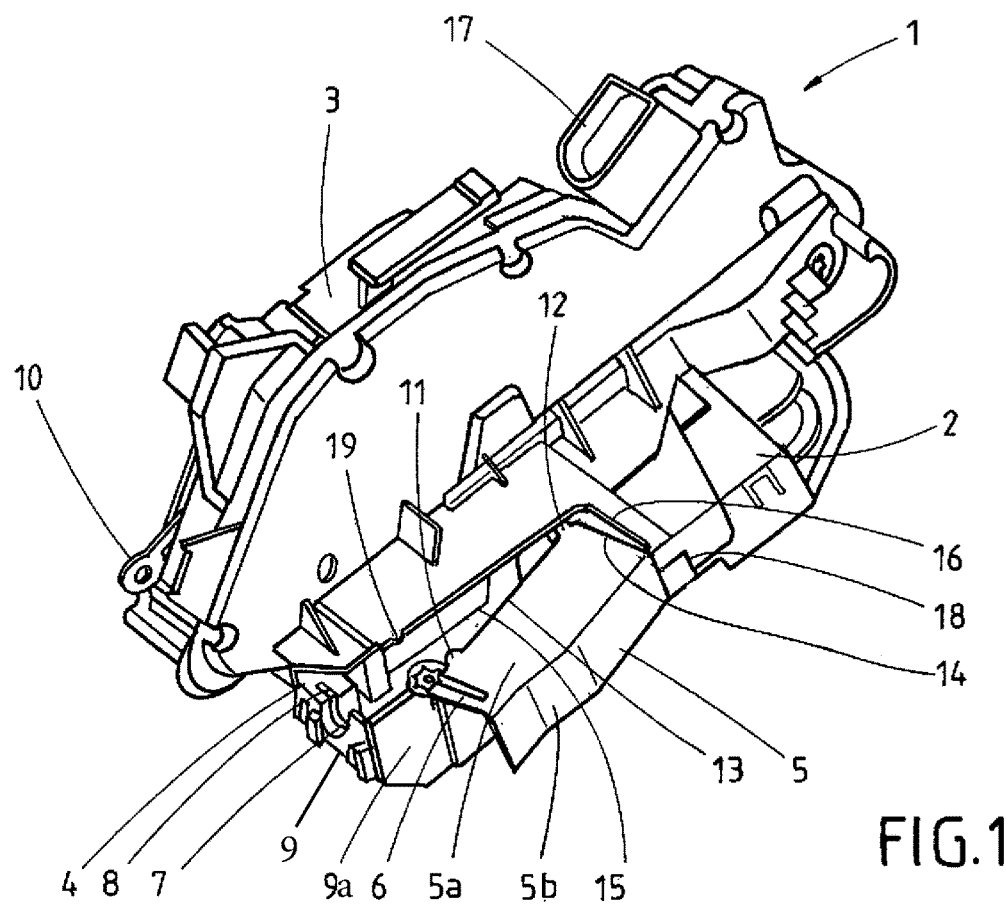
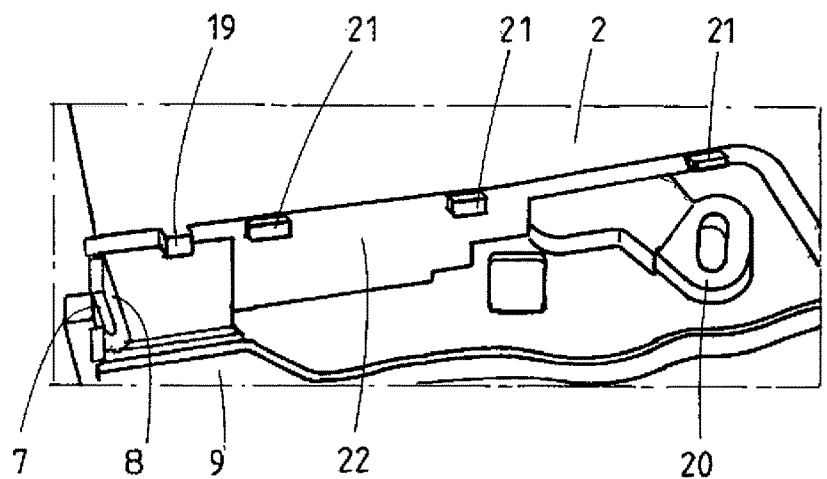

MOTOR VEHICLE LOCK TOGETHER WITH A MANUFACTURING METHOD

The present invention relates to a lock with the generic characteristics of claim 1 for a motor vehicle or for a building and to a manufacturing method. A lock for a motor vehicle is used for locking a motor vehicle door or tailgate. A door or a gate of a building can also be locked with a lock of the aforementioned type.

The aforementioned lock mainly contains a lock case with a locking mechanism mounted on said lock case and comprising at least a rotary latch and at least a pawl, a lock housing, a cover for at least parts of the housing and, where applicable, at least a locking means and at least an activation device. Said cover for the lock housing is generally provided by a so-called lock cover. To lock a door or tailgate in a motor vehicle, the rotary latch engages around a bolt catch arranged in most cases on the car body and is then locked by the pawl in the locking position referred to as fully closed position. The at least one activation device serves to release this latched arrangement for opening of the door or tailgate. The activation device in motor vehicles are often internal and external door handles. Locking the lock with a respectively installed locking means deactivates the lock activation or reactivates it again when unlocking.

A lock case contains a base surface with one or several side walls. A side wall of the lock case forms a right angle with the base surface. Generally, two side walls are provided that face each other. The lock case has in this case a U-shaped cross section. Where the lock case is a flat plate this is referred to as a lock plate. Any below reference to a lock case also includes the case of a lock plate.

The rotary latch and pawl are generally rotatably mounted on the lock case, made in most cases of metal and are preferably mounted on its base surface.

Often, the lock case fulfils further functions and can, for instance, be used for fixing the lock to a vehicle door or vehicle tailgate. Also, other components or parts can be fixed to the lock case, such as a rotatably mounted blocking lever that can block the pawl in its detent position. Usually, the arrangement also includes a reinforcement plate, generally also made of metal, used to provide an additional rotatable fixing of the rotary latch and/or pawl. The rotary latch and the pawl are generally located between the lock case and the reinforcement plate.

The components of a motor vehicle lock must generally be protected against environmental influences such as dust and humidity, which is mainly the task of the lock housing. The lock housing is usually made of plastic for weight reasons and can be made up of several parts.

In summary, a lock can consequently be made up as follows. The locking mechanism is arranged on the base surface of a lock case, generally made of metal. On top of this, a lock housing or lock housing part, generally made of plastic, is inserted or placed. This is followed by a reinforcement plate, generally made of metal, assisting with the rotatable mounting of components of the locking mechanism such as the rotary latch and pawl. Usually, the lock housing is then covered by a lock cover. Such a cover can, however, at least partly, be provided by other assembly units, such as a housing of a cover for a central locking drive. These other covering parts are also included below under the collective term of lock cover.

Such a lock also includes an activation device. With the aid of the activation device a latched locking mechanism, in which the rotary latch is prevented by a pawl from being pivoted into the open position, can be opened. A usual component of such an activation device is an activation lever of the lock. When the activation lever is activated, i.e. moved from an initial position into an end position, the locking mechanism is opened. This activation lever is often connected to a door handle by means of a Bowden cable. When the handle is activated, the activation lever is actuated by means of the Bowden cable. A lock can also contain two activation levers. Usually, one activation lever can then be actuated by the internal door handle and the other activation lever by the external door handle, in order to open the latched locking mechanism by this actuation.

The lock of the invention can include one or several characteristics of a lock, listed above as an option. The lock of the invention contains, in particular, the summarized arrangement. Any combination is possible.

A lock for locking a door of a motor vehicle containing a lock housing is disclosed in the German Patent Application 199 55 693 A1. The lock contains a cover, at least partially covering a mechanical connecting means.

The cover can be held by a clamshell. The clamshell is swivel mounted with the aid of a foil hinge.

Also motor vehicle locks exist in which the mechanical connecting means for the activation of the lock are protected by a separate covering element.

The invention has the task of providing a reliably functioning lock that can be produced with little production effort.

To solve this task, a motor vehicle lock contains the characteristics of claim 1. Advantageous embodiments are described in the sub-claims. A method for manufacturing is also disclosed in the subsidiary claim.

To solve the task, a lock is provided with a lock case with a locking mechanism, a lock housing, a cover and an activation device. A lever and preferably an activation lever of the activation device is covered at least partly by a pivotable flap on the cover. On one hand it thus provides protection against external influences for the mechanical connecting means on the activation lever. On the other hand, the flap can be moved from a covering position into an opened position, making the activation lever or at least part of the activation lever accessible, e.g. for producing the mechanical connecting means during installation. With the flap open, the core of a Bowden cable can, for instance, be connected to the activation lever. The flap is then closed. The activation lever is then protected inside the housing of the lock.

Due to the pivotable mounting of the flap, no additional part has to be provided that has to be produced, stored, handled and installed. Although it is generally the aim to reduce the number of parts, this must not result in additional manufacturing effort, as cost reductions are a major aim in this industry. It therefore suffices that the flap is produced as a single piece together with another part of the cover, in particular by injection molding. A large, separately arranged flap in the area of the mechanical connecting means is therefore not required. The pivotable flap is basically captively mounted on the housing or cover. Consequently no separate part has to be installed during production or installation of the lock in the motor vehicle.

In one embodiment of the invention the flap contains a detent mechanism, such as a flexible hook, with the aid of which the flap can be latched in the closed state, preferably with the lock cover or another cover. The detent mechanism then ensures that the flap cannot be opened unintentionally.

In one embodiment, a component of the activation device, such as a Bowden cable or, for example, the core of a Bowden cable extends though an opening in the lock housing. This component, e.g. the Bowden cable is connected, in particular, to the activation lever. This connection is generally detachable, which means that the Bowden cable can be connected to or disconnected from the activation lever without tools. In such an embodiment, the flap is preferably attached in such a way that it can be pivoted away from the said opening in the lock housing to allow opening of the flap. Attaching the said component, such as the Bowden cable is then particularly easy if the flap has first been opened.

In one embodiment of the invention, the detent mechanism at said opening is arranged in the lock cover. This detent mechanism is then particularly easy to reach to release the detent connection and open the flap.

The said opening for the mechanical connecting means in the lock housing can be reinforced with an insert, made in particular of metal, in order to ensure a good operational reliability. The reinforcing insert can be part of the lock case or part of a reinforcing plate. As regards the reinforcing insert, we refer to the German Patent Application DE 10 2007 049 078 A1.

In one embodiment of the invention the flap is arranged in such a way that it can be pivoted parallel to the base surface of the lock housing. In particular in this embodiment the flap contains two walls or wall areas, vertically connected to each other. In this embodiment it is, on one hand, possible to create a sufficiently large opening area by opening the flap, allowing particularly easy installation. Also, no flap has to be provided with a very large base surface thus increasing the space required. Nevertheless, it can be ensured that the flap in its closed state effectively protects the inside of the lock housing against any dust or humidity.

In one embodiment of the invention a wall area of the flap overlaps a wall area of the lock housing and/or the abutting cover, e.g. a lock cover, when the flap has been closed. Preferably a longitudinal section of the flap and a transverse section of the flap overlap adjacent wall areas of the housing. Between the flap and the adjacent wall areas of the housing a particularly tight connection is provided, offering particular reliable protection against dust and humidity.

One embodiment of the invention contains a groove or grove-like sections of the lock housing, in which an edge of the flap, i.e. the lateral wall area of the flap engages, when the flap is closed. On one hand this stabilizes the position and on the other hand it is ensured more reliably that a tight connection is provided between the flap and the adjoining housing wall when the flap is closed.

In one embodiment of the invention the flap and/or the lock housing or the cover contain one or more protruding projections, facilitating the correct closure of the flap. These projections guide the flap during closing. The projections can be designed as ramps to ensure that an edge region of the flap moves underneath or on top of a respective wall area of the lock housing when the flap is closed. In one embodiment, such a projection or projections are located in one or more corner areas of the flap, in order to particularly reliably achieve the desired said threading effect. Preferably a projection of the housing is arranged facing or adjoining at least one such corner area of the flap.

The lock housing cover is preferably manufactured together with the flap in such a way that the flap is open in the unloaded state. This means that after removal from the injection mould, the flap is in its opened position. The flap is then, for instance, positioned at an angle of approx. 45° to an adjacent side wall of the housing part. It can thus be produced as a single-piece and then as a pivotable arrangement.

Below, the invention and the technical background are explained in more detail with reference to the Figures.

In which:

FIG. 1: shows a lock for a motor vehicle

FIG. 2: shows an enlarged section of the lock

FIG. 1 shows a perspective view of a lock 1. The lock 1 contains a lock case 9, a lock housing 4 with a central locking housing 3 and a lock cover 2. The lock cover 2 contains a pivotably mounted flap 5 with wall sections 5a and 5b, vertically connected to each other. The flap 5 contains a resilient lever 6 with hook-shaped ends. When the flap 5 is closed, the hook-shaped lever 6 engages in a recess of a suitably arranged, protruding projection 19 of the lock cover 2 or of another adjacent cover. The flap 5 can then be opened again after latching by turning back the lever 6. The lever 6 is easily reachable above or adjacent to an opening 7 in the lock housing 4. The opening 7 is reinforced by a metal insert 8 as sufficiently described in the German Patent Application DE 10 2007 049 078 A1. To open the flap 5 the flap is pivoted away from the opening 7 in the lock housing 4 or in the housing 3 or in the cover 2. Adequate space is then available to easily install a Bowden cable, providing the mechanical connection to a lock lever. The metal insert 8 can be connected to a reinforcement plate of the lock or can be connected to the lock case made of metal, of which a side wall 9 is shown in FIG. 1. The side wall 9 is at right angle to the base surface of the lock case, not shown in the figure. A flap 5, not shown, can be pivoted parallel to the base surface of the lock case. A Bowden cable, not shown, is inserted through the opening 7 and connected to the activation lever, which in FIG. 1 is covered by a flap 5. Another activation lever 10 of the lock extends out of the housing part 3. The Bowden cable is, for instance, connected to an external handle of the associated door. The activation lever 10 is then, for instance, connected to an internal door handle.

The flap 5 contains protruding projections 11 and 12 on two corner sections, allowing the flap 5 to be threaded in during closing. The respective corner sections are located adjacent to the edge sections of the lock cover 2 or of another cover, when the flap 5 has been closed. The projections 11 and 12 as well as the edge sections, or lateral wall sections 13 and 14 of the flap 5 move underneath the edge sections or lateral wall sections 15 and 16 of the lock cover 2, when the flap 5 is closed. The projections 11, 12 can taper ramp-like towards the end, to facilitate threading. Groove-like sections are located under the edge sections 15 and 16, into which the edge sections 13 and 14 of the flap 5 enter when the flap 5 is closed. The lock 1 contains a connecting socket 17, into which an electric plug is inserted to provide the lock with electric power.

All lock housing parts 3, 4 and the lock cover 2 including the flap 5 are produced as a single piece from plastic by injection molding. The lock cover 2 and the flap 5 are, in particular, produced as a single piece, so that the flap can be pivotably moved around the lock cover in the area of the web 18. Due to the pivotable mounting, the flap 5 cannot be lost. The flap 5 is positioned and attached in such a way that it does not hinder installation despite of its fixing. A particularly suitable plastic material of which the flap 5 and the respective lock cover 2 is produced, is PBT GF20, a polybutylen-terephthalate reinforced with glass fiber.

FIG. 2 shows an enlarged section from a slightly different perspective. The figure shows an end 20 of an activation lever connected to the Bowden cable. This end 20 is covered by the flap 5 in the lock cover shown in FIG. 1. The figure also shows groove-shaped sections 21, into which the edge section 13 of flap 5 shown in FIG. 1 moves, when the flap 5 is closed. In order to provide particular good protection for the activation lever with the end 20, an internal wall 22 is provided that is vertically connected and forms a single piece with the lock cover 2. The internal wall 22 contributes to preventing dust and humidity from entering the inside of the lock 1. The internal wall 22 separates the end 20 of the activation lever from other areas of the activation levers and other components inside the lock housing 3, 4. The internal wall 22 adjoins the end of the lever 20.

LIST OF REFERENCE NUMBERS

1: Lock
2: Lock cover
3, 4: Lock housing parts
5: Flap with wall sections 5a and 5b
6: Resilient lever with hook-shaped end
7: Opening
8: Metal insert
9: Side wall
10: Activation lever
11, 12: Projections of the flap edge sections of the flap
13, 14: Edge section of a lock housing part
15, 16: Connecting socket
18: Pivotable web section
19: Protruding projection with recess
20: End of an activation lever
21: Groove-shaped section
22: Internal wall

The invention claimed is:

1. A lock comprising: a lock housing and lock cover that covers the lock housing, a lock case with the lock housing being placed on the lock case, a locking mechanism mounted on a base surface of the lock case and an activation device for opening the locking mechanism, wherein:
   the activation device includes an activation lever that is at least partially covered by a pivotable flap of the lock cover when the pivotable flap is in a closed position;
   the pivotable flap has a pivot axis that is perpendicular to the base surface of the lock case;
   the pivotable flap contains a first wall section and a second wall section, connected to each other along a common edge, wherein the first wall section has an edge connected to the pivot axis, and the second wall section extends perpendicularly from the first wall section along the common edge; and
   the lock case includes a side wall that extends at a right angle from the base surface, and the first wall section extends along the side wall between the base surface and the second wall section to cover the side wall when the pivotable flap is in the closed position.

2. The lock according to claim 1 with a detent mechanism with which the pivotable flap can be latched in the closed position.

3. The lock according to claim 2, in which the detent mechanism contains a flexible lever with a hook that is part of the pivotable flap.

4. The lock according to claim 1, in which a Bowden cable is part of the activation device and in which the Bowden cable extends through an opening in the lock housing and in which the Bowden cable is detachably connected to the activation lever.

5. The lock according to claim 4, in which the pivotable flap is fixed in such a way that it can be pivoted away from the opening in the lock housing for opening the pivotable flap.

6. The lock according to claim 1, in which a detent mechanism abuts an opening in the lock housing for latching the pivotable flap in a closed position, through which a component of the activation device comprising a Bowden cable extends.

7. The lock according to claim 1, with an opening in the lock housing, through which a component of the activation device extends and in which the opening is reinforced by a reinforcement insert made of metal.

8. The lock according to claim 1, wherein the second wall section of the pivotable flap comprises a longitudinal section and a transverse section that overlap with a wall section of the lock housing in the closed position of the pivotable flap.

9. The lock according to claim 1, wherein an edge section of the pivotable flap enters a groove or one or several groove sections of the lock housing when the pivotable flap is moved to the closed position.

10. The lock according to claim 1, wherein the lock housing contains at least one internal wall abutting against one end of the activation lever.

* * * * *

UNITED STATES PATENT AND TRADEMARK OFFICE
CERTIFICATE OF CORRECTION

PATENT NO. : 9,677,304 B2
APPLICATION NO. : 13/983336
DATED : June 13, 2017
INVENTOR(S) : Bendel et al.

Page 1 of 1

It is certified that error appears in the above-identified patent and that said Letters Patent is hereby corrected as shown below:

On the Title Page

Insert Item (30):
-- (30)  Foreign Application Priority Data
Feb. 2, 2011    (DE) ........................102011010175.6 --.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*